United States Patent Office 3,333,902
Patented Aug. 1, 1967

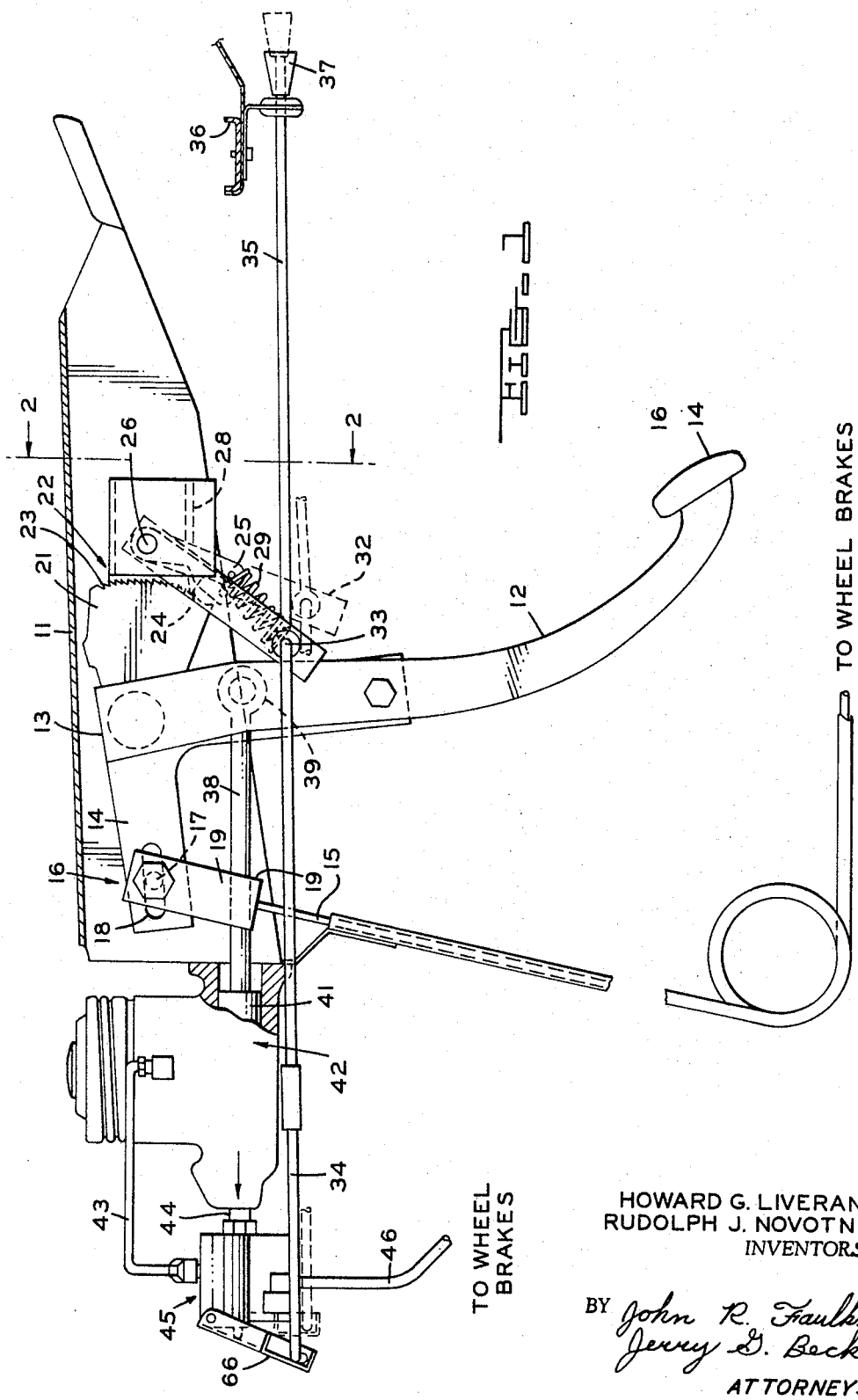

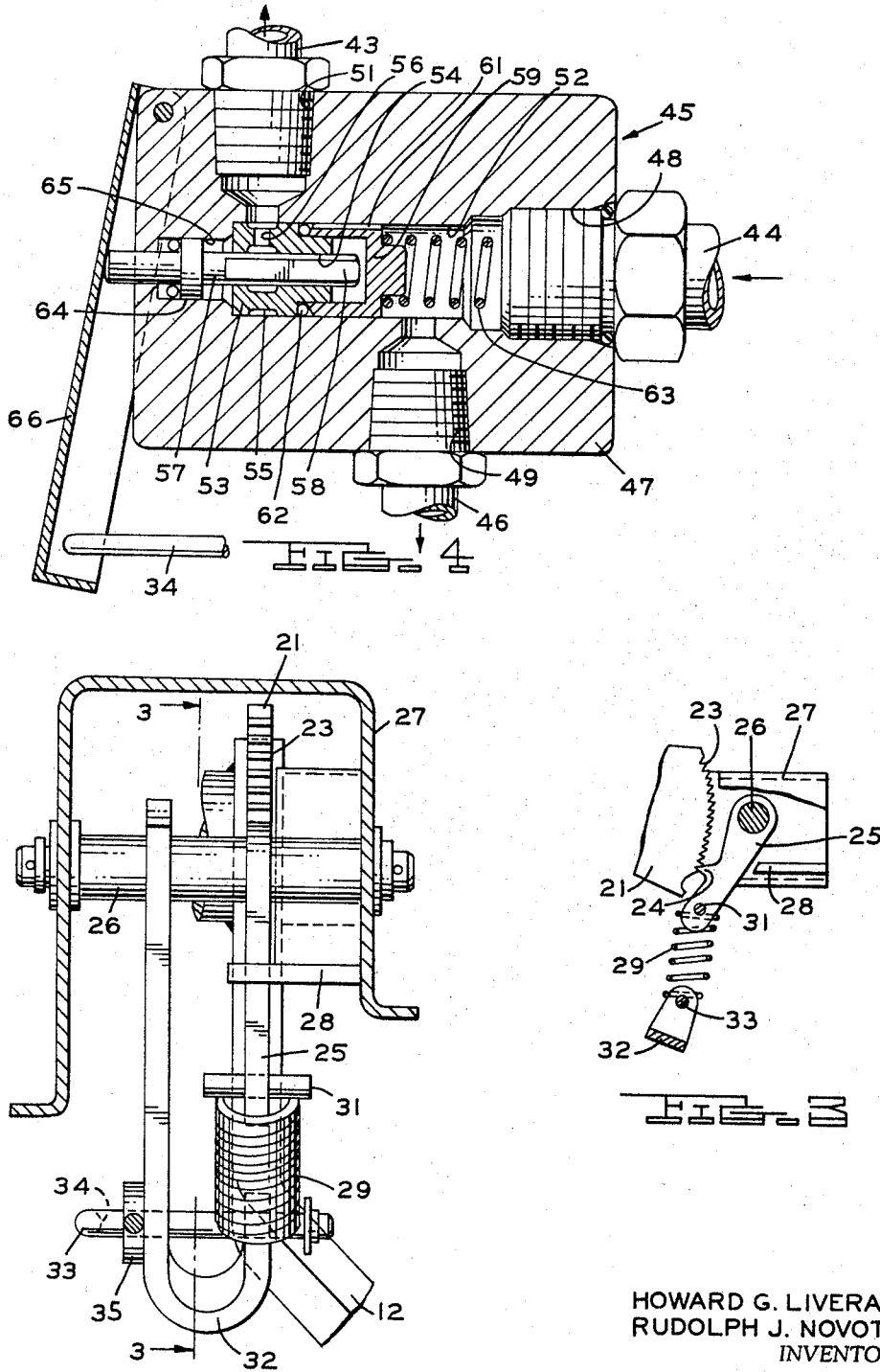

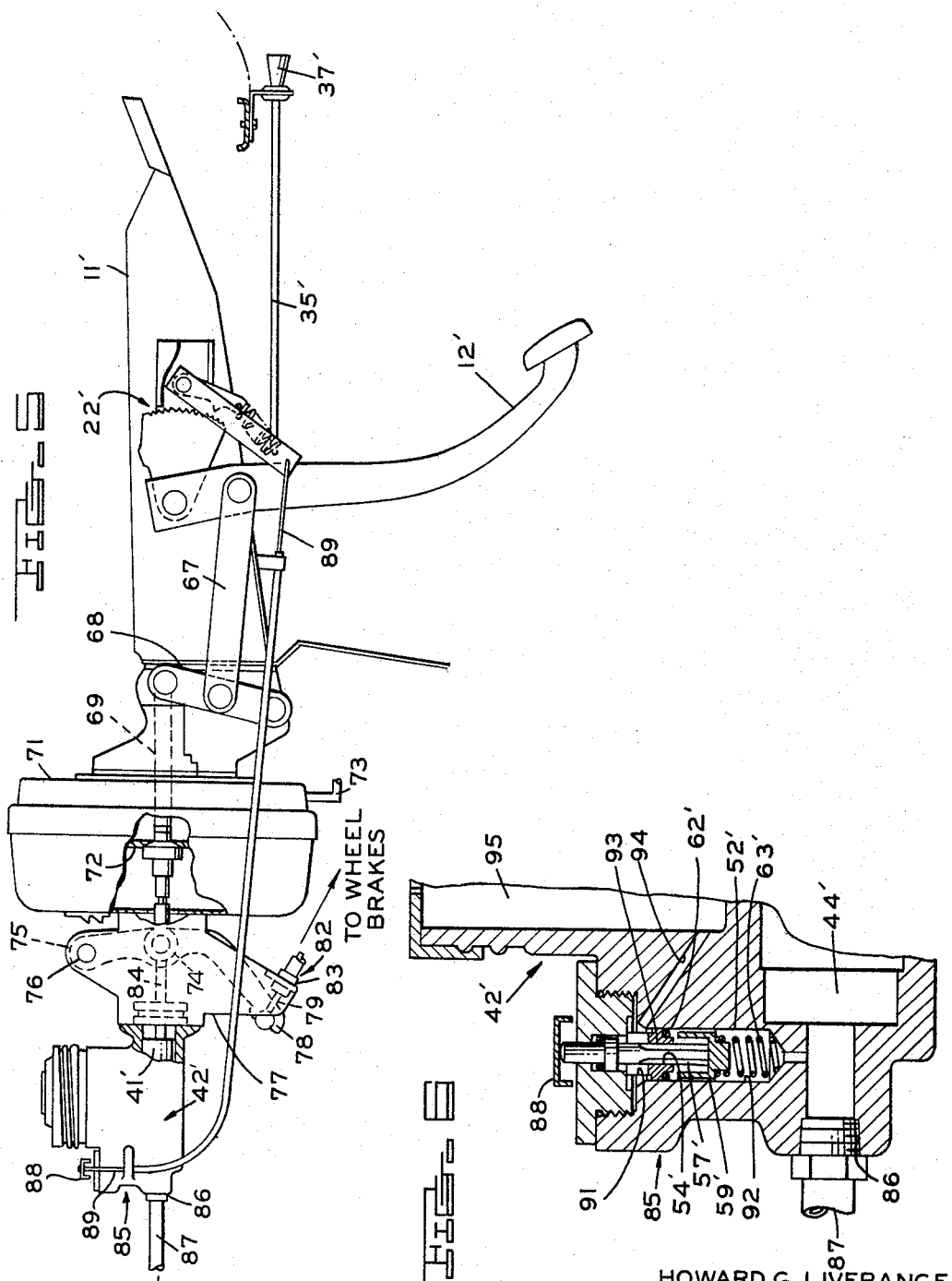

3,333,902
INTEGRATED BRAKE SYSTEM
Howard G. Liverance, Trenton, and Rudolph J. Novotny, New Boston, Mich., assignors to Ford Motor Company, Dearborn, Mich., a corporation of Delaware
Filed Aug. 31, 1964, Ser. No. 393,276
14 Claims. (Cl. 303—2)

This invention relates to an integrated parking and service brake system. More particularly, it relates to a motor vehicle brake system that provides hydraulic service braking and mechanical parking or emergency braking, all by operation of the same pedal.

In current motor vehicles, the driver operates the hydraulic service brake system by depressing the conventional brake pedal. The mechanical brake system, for parking or emergency purposes, is generally actuated independently so that if the hydraulic system fails, the mechanical brake system can always be utilized by the driver to bring the vehicle to a stop. However, the time it takes for the driver to locate and actuate the mechanical brake system after a failure of the hydraulic system is detected is very critical if accidents are to be prevented. Therefore, a reduction in this time element is very desirable.

In recent years, split or tandem master brake cylinders have been installed in some vehicles to provide alternate sources of brake fluid in case one should not function. This additional protection, though, is ineffective if the hydraulic conduits or seals located beyond the hydraulic actuating system fail.

Attempts have been made in the past to design brake systems that utilize one pedal for actuating both the service and parking brakes. Such designs, however, have not provided a fail-free system that permits an automatic transition to mechanical brakes upon failure of the hydraulic brake system. For this reason, none of these known brake systems have been adopted by the automotive industry.

Accordingly, a principal object of this invention is to provide two parallel braking systems for motor vehicles that are actuated by a common pedal; a hydraulic system for service braking and a mechanical system for emergency braking and for parking. If a hydraulic failure should occur, the mechanical brake system will automatically be actuated and full driver control will be maintained. A small amount of lash is built into the mechanical system so that a slight pedal drop will be felt by the driver at the instant of hydraulic failure.

In a preferred embodiment of this invention, a further improvement is incorporated to permit the driver to select at will which system is to be used; either the hydraulic system for service braking or the mechanical system for parking. To operate the parking brake, the driver pulls out a control knob and depresses the brake pedal. Actuation of the control knob opens a fluid distribution valve that renders the hydraulic service brake system inoperative. Movement of the same knob also renders a locking mechanism effective to keep the brake pedal depressed and maintains the mechanical parking brake in an actuated condition. This arrangement may be used with either a manual or power booster brake system.

Another object of this invention is to provide for the actuation of a mechanical brake system for emergency stopping by further depression of the conventional foot pedal after the hydraulic brake system has failed.

A further object of this invention is to provide a one-pedal integrated vehicle brake arrangement having a hydraulic service brake system and a mechanical parking brake system with the latter being conditioned for operation by a dashboard-mounted control knob.

Other objects and advantages of the invention will become apparent during the course of the following description in conjunction with the accompanying drawings, in which:

FIGURE 1 is a side-elevational view of an actuating mechanism of this invention for the hydraulic and mechanical brake systems of a motor vehicle;

FIGURE 2 is an enlarged sectional view taken along line 2—2 of FIGURE 1;

FIGURE 3 is a side view on a reduced scale and partially in section taken along line 3—3 of FIGURE 2;

FIGURE 4 is an enlarged cross-sectional view of a fluid distributing valve associated with the actuating mechanism of this invention;

FIGURE 5 is an alternate embodiment of the actuating mechanism of this invention; and, FIGURE 6 is a cross-sectional view of a fluid distributing valve associated with the actuating mechanism shown in FIGURE 5.

FIGURE 1 shows a main support member 11 attached to the cowl structure of a motor vehicle. A conventional brake pedal 12 extends into the driver's compartment and is pivotally supported at its upper end 13 on support 11. The pedal has a forwardly projecting portion 14 that is fixed to the end of a brake actuating wire 15 by a lost-motion connection 16. The connection includes a latch pin 17 that extends slidably through a slot 18 in portion 14. The pin 17 is fixed to a plate 19 that is secured to the wire 15. The wire forms one element of a conventional Bowden wire mechanism that is connected at its opposite end to the vehicle brakes (not shown). The brakes are mechanically actuated in a known manner upon movement of pedal 12 to the left of FIGURE 1. The lost-motion connection 16 permits a predetermined movement of pedal 12 before wire 15 is moved for a purpose to be described later.

Pedal 12 also has fixed to it a rearwardly projecting ratchet plate 21 that constitutes part of a locking mechanism 22 to maintain the brake pedal in a depressed or brake-applied position. Plate 21 is sector shaped and has a series of teeth 23 for cooperation with a dog 24 of a pawl 25. The pawl 25 is pivotally mounted at one end on a pin 26 secured in a U-shaped bracket 27 attached to member 11 (FIGURES 2 and 3). The bracket 27 is formed with a stop arm 28 that limits the retracting movement of the pawl 25.

The dog 24 of pawl 25 is normally biased into a locking engagement between the teeth 23 of the sector plate 21 by an overcenter spring 29. One end of the spring is slipped over the end of the pawl 25 and seated against a pin 31 fixed to the pawl 25. The opposite end of the spring is fitted over the upturned end of a hook-shaped lever 32 and compressed against a shaft 33 extending loosely through openings in the lever 32. The lever 32 is pivotally mounted at its upper end on pin 26.

Shaft 33 constitutes the short leg portion of an L-shaped actuating rod 34. The rod 34 extends forwardly (FIGURE 1) to the hydraulic service brake system to be described hereinafter. Shaft 33 pivotally supports the rounded end portion of another actuating rod 35. This latter rod extends rearwardly through a cowl support 36 into the driver's compartment where it ends in a control knob 37.

When the control knob 37 is pulled to the right or towards the driver, shaft 33 swings lever 32 about pin 26 to the position shown in broken lines in FIGURE 1. This forces the spring 29 to move overcenter and force the pawl 25 to move dog 24 into the space between two of the teeth 23 on the ratchet plate 21. The teeth 23 are cut and the dog 24 is angled such as to permit ratcheting of the dog 24 over the teeth 23 as the pedal 12 is depressed and the plate 21 is moved clockwise. Counterclockwise return movement, however, is prevented so long as the knob 37 is to the right. Thus, once knob 37 is pulled out and the brake pedal 12 is depressed, the pedal will remain depressed. This constitutes the parking brake and emergency braking system. When the knob 37 is pushed in again to the position shown, the rod 35 will move lever 32 to reposition the spring 29 and move dog 24 out of engagement with the ratchet plate teeth. The normal brake pedal return spring (not shown) can then operate.

As stated previously, the brake pedal 12 also is connected to a hydraulic brake system. An operating rod 38 is pivotally connected at one end 39 to pedal 12 and at its opposite end to the reciprocating piston 41 of a conventional brake master cylinder assembly 42. The assembly has usual fluid reservoir (not shown) and inlet line 43 and outlet line 44. A fluid distribution or bypass valve, indicated generally at 45, controls flow between these two lines and a third line 44, either supplying fluid to the vehicle brake cylinders through line 46 or bypassing the fluid from outlet line 44 back to the reservoir through inlet or return line 43 in a manner that will be described in more detail later.

In normal operation, when pedal 12 is depressed, movement of piston 41 to the left will force brake fluid from the master cylinder assembly 42 through line 44 past valve 45 into line 46 and to the vehicle wheel cylinders (not shown) to actuate the brakes at each wheel.

FIGURE 4 shows an enlarged sectional view of the fluid distribution valve assembly 45. A valve body 47 is provided with a fluid inlet 48 and two outlets 49 and 51 connected, respectively, to the master cylinder outlet line 44 and lines 46 and 43. The valve body 47 has a cylindrical chamber 52 that interconnects inlet 48 with outlets 49 and 51. One end of the chamber 52 is provided with a stationary bushing 53 that has a longitudinal bore 54. A number of annular grooves 55 and cross bores 56 connect bore 54 to bypass outlet 51. A rod 57 is slidably mounted in bore 54 and has a series of flats 58 which permit fluid to flow from line 44 to line 43.

Chamber 52 slidably receives a hollow plug 59 that has a longitudinally slotted portion 61. The plug 59 slides over a reduced diameter portion of bushing 53 and against an O-ring 62. The plug 59 is normally loaded against the O-ring 62 and bushing 53 by a spring 63 to prevent leakage of brake fluid from line 43 to outlet 51. The plug 59 can be moved off its seat by rightward movement of operating rod 57 to permit a bypass of the brake fluid back to the reservoir. Rod 57 is adapted to be moved by the dashboard-mounted control knob 37 (FIGURE 1) in the following manner. Near its left end (FIGURE 4), rod 57 is formed with a guide land 64 that has a sliding fit within a sealed, reduced diameter extension 65 of chamber 52. The end of the rod 57 projects out through the valve body 47 for abutment by an actuating plate 66. The plate 66 is pivoted at its upper end to the valve body 47 and at its lower end is connected to the actuating rod 34 previously described.

As best seen in FIGURE 1, movement of control knob 37 to the right will, through rods 35 and 34, swing actuating plate 66 in a counterclockwise direction. This moves the rod 57 into chamber 52 until it engages the plug 59 and moves it towards the inlet 48. Since line 46 is filled with fluid and the fluid in line 44 will flow in the direction of least resistance, the fluid will flow through the slotted portion 61 around the end of plug 59 through the space between the bore 54 and flats 58 and out through outlet 51. Brake fluid will thus be returned to the reservoir of the master cylinder 42.

When the operator pushes knob 37 to the position shown in FIGURE 1, the movement of rods 35 and 34 will pivot the plate 66 back to the position shown in FIGURE 4 and permit spring 63 to reseat plug 59 and the O-ring seal 62 against the bushing 53. The outlet 51 will then again be blocked and normal communication will be effected between lines 44 and 46.

The over-all operation of this embodiment of the invention is as follows:

With knob 37 in the inoperative position shown, initial depression of pedal 12 causes a leftward (FIGURE 1) movement of rod 38 to move piston 41 and supply hydraulic brake fluid through lines 44 and 46 to the vehicle wheel cylinders. Thus, the vehicle service brakes are actuated. The mechanical emergency or parking brake system at this time is not actuated, since the lost motion connection 16 is designed to permit enough movement of rod 38 to actuate the hydraulic system without actuating the mechanical system. However, should a failure in the hydraulic system occur, further depression of the brake pedal 12 will cause the slot 18 to bottom against pin 17, and wire 15 will then be moved to apply the vehicle brakes. Furthermore, if parking is desired at this or any time, movement of knob 37 to the right will move the spring 29 overcenter and engage dog 24 between the teeth 23 of ratchet plate 21 to lock the pedal 12 in a depressed position with the brakes applied. This movement of knob 37 will also simultaneously move the fluid distribution valve 45 to a position causing the hydraulic fluid to be bypassed or shunted from the vehicle wheel cylinder to permit the operation of the mechanical brake system by the pedal.

FIGURES 5 and 6 show a further embodiment of the invention in which a power boost is provided for both the hydraulic and mechanical actuation of the vehicle brakes. In this embodiment, elements similar to the elements depicted in the embodiments of FIGURES 1 through 4 have been given the same numbers primed. FIGURE 5 shows the brake pedal 12' pivoted at its upper end to support member 11', as in FIGURE 1, and having the same mechanical brake locking system indicated at 22'. The rod 38 of FIGURE 1 embodiment is replaced by a link 67 that is pivoted to the central portion of a lever 68. Lever 68 is fulcrumed at its lower end to support member 11' and is pivotally connected at its upper end to one end of an operating rod 69. Rod 69 extends outwardly through the end wall of a known type of vacuum cylinder 71. It contains the usual spring centered diaphragm 72 to which rod 69 is secured. The cylinder 71 may be connected through a vacuum line 73 to the vehicle engine intake manifold, for example, or to a vacuum tank (not shown) as in the conventional practice.

When pedal 12' is depressed by the driver, a valve (not shown) is opened which provides a vacuum in line 73 and on one side of the diaphragm 72 to provide a power assist in moving the operating rod 69 by pedal 12'.

Operating rod 69 has a forward portion that extends from the diaphragm 72 to a pivotal connection 74 with the central portion of a bell crank 75. The bell crank 75 is pivotally mounted at its upper end 76 in a housing 77 that encloses the bell crank. The lower end of the bell crank 75 has a ball and socket connection 78 to the end of a wire 79 that is similar to wire 15 of FIGURE 1 and is part of a conventional Bowden wire cable assembly 81 connected to the mechanical brakes. A conduit 82 encloses wire 79 and is rigidly attached to housing 77 by a nut 83. Sufficient slack is provided in the Bowden wire cable assembly 81 before axial movement of the wire 79 will actuate the mechanical brakes.

A second rod 84, for operating the hydraulic system for service braking, is attached to operating rod 69 at the pivotal connection 74 where rod 69 is attached to bell crank 75. Operating rod 84 is connected at its opposite end to piston 41' of the master brake cylinder assembly 42' which, while similar to that shown in FIGURE 1, in this instance is depicted as being integrally formed with a fluid distribution valve 85 (FIGURE 6).

The master brake cylinder assembly 42' has an outlet 86 that is normally connected by a conduit 87 to the wheel cylinders to permit hydraulic actuation of the brakes upon depression of the brake pedal. The fluid distribution valve 85 functions substantially in the same manner as valve 45 shown in FIGURES 1 through 4, except that it is positioned vertically and the actuator is slightly different.

The operating rod 57' is moved by a T-shaped plate 88 that is operatively connected by a wire 89 and rod 35' to the control knob 37'.

The cylindrical chamber 52' in this embodiment is separated into an upper portion 91 and a lower portion 92 by a stationary bushing 93. A bored passage 94 connects upper portion 91 to reservoir 95. Flow through the bushing bore 54' is blocked by the spring-loaded plug 59' which operates in a manner similar to the plug 59 in FIGURE 4.

When control knob 37' is pulled out or to the right by the driver, plate 88 will push plug 59' into the lower chamber portion 92 to provide a gap between the end face of the plug 59' and the O-ring 62'. Thus, when pedal 12' is depressed, brake fluid will flow from outlet 44' into lower chamber 92 around the end of plug 59' and through bored hole 94 into the reservoir 95 of the master cylinder 42', bypassing outlet 86. Thus, the vehicle wheel cylinders are not actuated.

When control knob 37' is pushed in or to the left, the spring 63' will bias the plug 59' against the O-ring 62' and bushing 93 to block the bypass of the brake fluid into the reservoir 95 and thus condition the fluid to pass through outlet 86 and conduit 87 to actuate the hydraulic brakes.

In the over-all operation of the embodiment shown in FIGURES 5 and 6, it can readily be understood that the vacuum cylinder 71 provides a power assist in the actuation of both the mechanical and hydraulic braking systems of the vehicle. To assure that the mechanical brake system is actuated only in the event the hydraulic brake system fails or when it is rendered inoperative by movement of knob 37', and then immediately thereafter, sufficient slack is provided in the Bowden wire cable assembly 81 connected to the second bell crank 75 as mentioned. It has the same effect as the lost motion connection described in the first embodiment. It can be readily understood that the slack in the Bowden wire cable assembly 81 has to be taken up completely before the mechanical brake system is actuated, and that this will only occur when the hydraulic brake system is inoperative.

As the vacuum cylinder 71 is mounted between pedal 12' and both brake systems, power assistance is effected in the operation of either system by depressing the common foot pedal 12'.

It can be readily understood from the descriptions of the embodiments that the integrated brake system of this invention provides for the actuation of the mechanical brake system as an emergency brake in case of failure of the hydraulic brake system by further depressing the same foot pedal. As the two parallel brake systems are connected so as to operate sequentially, the driver does not have to lift his foot from the pedal to locate and actuate a second lever or pedal to operate the mechanical brakes as in conventional vehicles. Also, by the operation of the control knob 37', the same mechanical brake system that is used for emergency purposes can also be utilized as a parking brake. The control knob 37' disables the hydraulic brake system and at the same time actuates the locking means to lock the mechanical brake to maintain it in an actuated condition for parking purposes after the pedal 12' has been depressed by the driver.

It will be understood that the invention is not to be limited to the exact construction shown and described but that various changes and modifications may be made without departing from the spirit and scope of the invention as defined in the appended claims.

We claim:

1. A brake system comprising a brake and an actuating means for said brake, said actuating means including a fluid pressure force applying means and a mechanical force applying means each connected to said brake, means common to and connected to said fluid pressure and mechanical force applying means for actuating said applying means in sequence whereby failure of said fluid pressure force applying means permits actuation of said brake by said mechanical force applying means, and control means connected to said fluid pressure force applying means for rendering the latter inoperable to permit actuation of said brake by said mechanical force applying means, said control means including means maintaining said mechanical force applying means in a brake actuating condition.

2. A brake system comprising a brake and an actuating means for said brake, said actuating means including a fluid pressure force applying means and a mechanical force applying means each connected to said brake, linkage means common to and connected to said fluid pressure and mechanical force applying means for actuating said applying means in sequence whereby inoperativeness of said fluid pressure force applying means permits actuation of said brake by said mechanical force applying means, and selectively manually operable control means for rendering said fluid pressure force applying means inoperable at will to permit actuation of said brake by said mechanical force applying means, said control means also including means operatively connected to said mechanical force applying means to maintain the latter in a brake actuating condition.

3. A brake system comprising a brake and an actuating means for said brake, said actuating means including a hydraulic force applying means and a mechanical force applying means each connected to said brake, movable lever means, linkage means connecting said lever means to said hydraulic force applying means and said mechanical force applying means, said linkage means including means for actuating the hydraulic force applying means and said mechanical force applying means sequentially upon movement of said lever means, and control means connected to said hydraulic force applying means to render the latter inoperative to permit actuation of said brake by said mechanical force applying means upon movement of said lever means, said control means including means retaining said moved lever means to a position to maintain said mechanical force applying means in a brake actuating condition.

4. A brake system comprising a brake movable from a nonbraking position to a braking position, and an actuating means for said brake, said actuating means comprising a hydraulic force applying means and a mechanical force applying means each connected to said brake, depressible pedal means, linkage means connecting said pedal means to said hydraulic force applying means and said mechanical force applying means, said linkage means including means for actuating said hydraulic force applying means upon initial depression of said pedal means to move said brake to a braking position and actuating said mechanical force applying means upon further depression of said pedal means to move said brake to a braking position upon failure of said hydraulic force applying means to do so, and a manually operable control means operatively connected to said pedal means and said hydraulic force applying means, said control means being operable to disable said hydraulic force applying means to permit actuation of said mechanical force applying means upon further depression of said pedal means, said control means including means retaining said pedal means in a depressed position to maintain said mechanical force applying means in a brake actuating condition.

5. A brake system comprising a brake and an actuating means for said brake, said actuating means comprising a hydraulic force applying means and a mechanical force applying means each connected to said brake, depressible pedal means, linkage means connecting said pedal means to said hydraulic force applying means and said mechanical force applying means, said linkage means including a lost motion transfer means between said pedal means and said mechanical force applying means effecting sequential actuation of said hydraulic force and mechanical force applying means by said pedal means, initial depression of said pedal means actuating said hydraulic force applying means and further depression of said pedal means actuating said mechanical force applying means upon inoperativeness of said hydraulic force applying means, and a manually operable control mechanism operatively connected to said pedal means and said hydraulic force applying means, said control mechanism being operative to render said hydraulic force applying means inoperative to permit application of said brake by said mechanical force applying means upon further depression of said pedal means, said control mechanism including means to retain said pedal means in a depressed position maintaining said mechanical force applying means in a brake actuating condition.

6. A brake system comprising a brake movable to a braking position, and a device for actuating said brake, said device including a hydraulic force applying means and a mechanical force applying means connected to said brake, a depressible pedal, linkage means connecting said pedal to said hydraulic force applying means and said mechanical force applying means, said linkage means including means for actuating said hydraulic force applying means and said mechanical force applying means sequentially upon depressing of said pedal, a source of fluid pressing, conduit means connecting said source of fluid pressure to said hydraulic force applying means and said brake, fluid distribution valve means in said conduit means to control the flow of fluid to said brake, said fluid distribution valve means being selectively operable to block or permit the flow of fluid through said conduit means, and a manually movable control means connecting said pedal to said fluid distribution valve means, movement of said control means to one position rendering said fluid distribution valve means operable to block flow through said conduit means thereby disabling said hydraulic force applying means and permitting actuation of said mechanical force applying means when said pedal is depressed to move said brake to a braking position, said control means including means maintaining said pedal in a depressed position to retain said mechanical force applying means in a brake actuating condition.

7. A brake system comprising a brake movable to a braking position, and a device for actuating said brake, said device including a hydraulic force applying means and a mechaical force applying means connected to said brake, a source of fluid pressure, conduit means connecting said source of fluid pressure with said hydraulic force applying means and said brake, a depressible pedal, linkage means connecting said pedal to said hydraulic force applying means and said mechanical force applying means, said linkage means including lost motion transfer means for actuating the hydraulic force applying means and the mechanical force applying means sequentially upon depression of said pedal, fluid distribution valve means movably mounted in said conduit means, said fluid distribution valve means being movable to a position to render said hydraulic force applying means ineffective, locking means operatively connected to said pedal and operable to maintain said pedal in a locked position, and a manually movable control means operatively connected to said locking means and said fluid distribution valve means, movement of said control means to one position rendering said fluid distribution valve means operable to render said hydraulic force applying means inoperative and to permit the actuation of said mechanical force applying means by further depression of said pedal, movement of said control means to said one position also rendering said locking means operable to retain said depressed pedal in a locked position thereby maintaining said mechanical force applying means in a brake actuating condition.

8. The brake system as described in claim 7 and in which said locking means includes interengageable means between a portion of said control means and said pedal engageable upon movement of said control means to said one position to retain said pedal in a depressed position.

9. The brake system as described in claim 7 and in which said locking means includes pawl and ratchet means connected to said pedal and said control means, said pawl means being movable into engagement with said ratchet means upon movement of said control means to said one position to retain said pedal in a depressed position.

10. The brake system as described in claim 9 which includes spring means biasing said pawl means into engagement with said ratchet means upon movement of said control means to said one position.

11. The brake system as described in claim 7 and which is further characterized in that said fluid distribution valve means includes bypass means, said bypass means being movable to an opened position upon movement of said control means to said one position to cause the flow of fluid to be returned to said source of fluid pressure through a portion of said conduit means to prevent the flow of fluid through another portion of said conduit means to said brake thereby rendering said hydraulic force applying means ineffective for applying said brake.

12. The brake system as described in claim 7 and which is further characterized in that said fluid distribution valve means includes a chamber having a first outlet connected by a portion of said conduit means to said brake and a second outlet connected by another portion of said conduit means to said source of fluid pressure, valve operating means in said chamber movable between a first and a second position to control the flow of fluid through said first and second outlets, said movable control means operatively connected to said valve operating means, said valve operating means being moved to the second position upon movement of said control means to one position to cause recirculation of fluid through said second outlet back to said source of fluid pressure and to bypass said first outlet thereby rendering said hydraulic force applying means inoperative.

13. A brake system comprising a brake and an actuating device for applying said brake, said actuating device including a hydraulic force applying means and a mechanical force applying means connected to said brake, movable lever means, power assist means operatively disposed between said actuating device and said lever means, first linkage means connecting said lever means to said power assist means and second linkage means connecting said power assist means to said actuating device, said second linkage means including means for actuating said hydraulic force applying means and said mechanical force applying means sequentially upon movement of said lever means, means to actuate said power assist means upon initial movement of said lever means, and control means connected to said hydraulic force applying means for rendering the latter inoperative to permit actuation of said brake by said mechanical force applying means with the assistance of said power assist means upon movement of said lever means, said control means including means maintaining said mechanical force applying means in a brake actuating condition.

14. A brake system comprising a brake and means for actuating said brake, said actuating means comprising hydraulic force applying means and mechanical force applying means connected to said brake, a depressible pedal, power assist means, linkage means operatively connecting said pedal to said power assist means and said power assist means to said hydraulic force applying means, a bell crank operatively connected to said linkage means, said bell crank being swingable to an actuating position, lost motion means connecting said bell crank to said mechanical force applying means, means for rendering said power assist means operable upon initial depression of said pedal, said linkage means actuating said hydraulic force applying means upon initial depression of said pedal to apply said brake and swing said bell crank to an actuating position to actuate said mechanical force applying means through said lost motion transfer means upon further depression of said pedal when said hydraulic force applying means has failed to apply said brake, and a manually operable control means operatively connected to said pedal and said hydraulic force applying means, said control means being operable to render said hydraulic force applying means inoperative, to permit application of said brake by said mechanical force applying means upon further depression of said pedal, said control means including means to retain said pedal in a depressed position maintaining said mechanical force applying means in a brake actuating condition.

References Cited
UNITED STATES PATENTS 2,145,590    1/1939    Fitzgerald _____ 188—106
3,175,647    3/1965    Fabbro _____ 188—106

FOREIGN PATENTS 1,074,422    1/1960    Germany.

EUGENE G. BOTZ, *Primary Examiner.*